United States Patent [19]  
Fujibayashi

[11] Patent Number: 4,556,919  
[45] Date of Patent: Dec. 3, 1985

[54] TAPE RECORDER MOTOR CIRCUIT

[75] Inventor: Kenji Fujibayashi, Tokyo, Japan

[73] Assignee: Olympus Optical Co., Ltd., Tokyo, Japan

[21] Appl. No.: 477,011

[22] Filed: Mar. 21, 1983

[30] Foreign Application Priority Data

Mar. 30, 1982 [JP] Japan .............................. 57-45038[U]

[51] Int. Cl.$^4$ ....................... G11B 15/48; G11B 15/46
[52] U.S. Cl. ................................. 360/74.1; 360/74.2; 360/73
[58] Field of Search ..................... 360/74.1, 74.2, 74.3, 360/74.4, 74.5, 74.6, 74.7, 73; 318/6, 466, 139; 361/236, 234, 241

[56] References Cited

U.S. PATENT DOCUMENTS

| | | | |
|---|---|---|---|
| 3,583,617 | 6/1971 | Kosaka | 360/74.7 |
| 3,906,169 | 9/1975 | Iwase et al. | 360/74.2 |
| 4,322,765 | 3/1982 | Furuta | 360/74.1 |
| 4,413,290 | 11/1983 | Furuta | 360/74.1 |

FOREIGN PATENT DOCUMENTS 54-139706 10/1979 Japan ................................. 360/74.1  
1562909 3/1980 United Kingdom .............. 360/74.7

OTHER PUBLICATIONS

IEEE Transactions on Consumer Electronics, vol. CE-24, No. 1, "Higher Integration for Tomorrow's Cassette/Tape Recorders", Siligoni, pp. 126-134, Feb. 1978.

Primary Examiner—Raymond F. Cardillo, Jr.  
Assistant Examiner—Steven R. Garland  
Attorney, Agent, or Firm—Frishauf, Holtz, Goodman & Woodward

[57] ABSTRACT

A tape recorder motor circuit includes an automatic shutoff circuit and a motor servo circuit formed by a constant current circuit section, a bridge circuit, and an amplifier section. The constant current circuit section is connected to a power source through a switching transistor which is controlled by the automatic shutoff circuit. The amplifier section of the motor servo circuit is connected in a substantially direct manner to the power source, not through the switching transistor.

6 Claims, 2 Drawing Figures

TAPE RECORDER MOTOR CIRCUIT

BACKGROUND OF THE INVENTION

The present invention relates to a tape recorder, and more particularly, to a tape recorder with an automatic shutoff circuit.

A tape recorder with an automatic shutoff circuit automatically stops when the end of a magnetic tape is reached. The tape recorder is provided with a motor servo circuit. The voltage applied to the motor servo circuit may be decreased due to a power loss in the automatic shutoff circuit. If the tape recorder is driven by batteries, the motor servo circuit may fail when the ambient temperature is low or when the voltage applied to it is too low. Consequently, the tape speed may be reduced or the tape reels may be driven in an irregular manner.

SUMMARY OF THE INVENTION

An object of the invention is to provide a tape recorder with an automatic shutoff circuit, in which a motor servo circuit is not influenced by power loss in the automatic shutoff circuit.

According to the invention, there is provided a tape recorder with an automatic shutoff circuit, in which power is supplied from a power source to a constant current circuit section of a motor servo circuit through a switching element which is controlled by the automatic shutoff circuit, so that the power is supplied in a substantially direct manner from the power source to the motor drive circuit section of the motor servo circuit.

DETAILED DESCRIPTION OF THE PREFERRED EMBODIMENT

Figure 1:
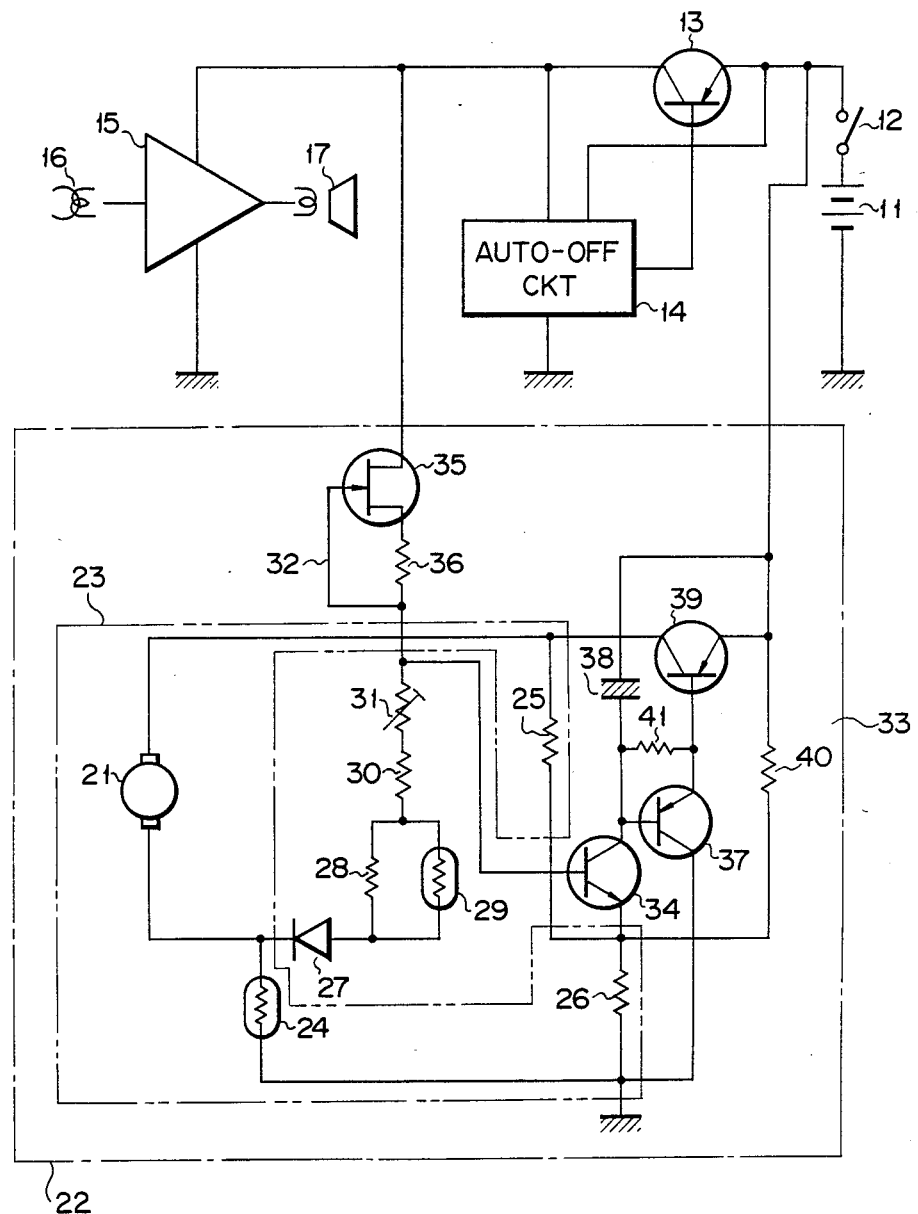
FIG. 1 is a circuit diagram of a tape recorder according to one embodiment of the present invention.

As shown in FIG. 1, the positive terminal of a battery 11 is connected to a power switch 12. The power switch 12 is connected to the emitter of a switching transistor 13 and also to the drive input terminal of an automatic shutoff circuit 14. The negative terminal of the battery 11 is grounded. The base of the switching transistor 13 is connected to the drive output terminal of the automatic shutoff circuit 14. The collector of the transistor 14 is connected to the power input terminal of the automatic shutoff circuit 14 and to the power input terminal of an amplifier 15. A magnetic head 16 is coupled to the input of the amplifier 15, and a loudspeaker 17 is connected to the output of the amplifier 15.

A motor 21 for actuating the driving mechanism included in a rotating section is connected in a motor servo circuit 22. The motor servo circuit 22 includes a bridge circuit 23. The motor 21 functions as one of the four branches of the bridge circuit 23, the thermistor 24, resistor 25, and resistor 26 respectively comprise the other three branches of the bridge circuit 23. One end of the motor 21 is grounded through a thermistor 24. The other end of the motor 21 is grounded through a series circuit of resistors 25 and 26. A connection point between the motor 21 and the thermistor 24 is connected to the cathode of a diode 27. The anode of the diode 27 is connected to one end of a resistor 30 via a parallel circuit of a resistor 28 and a thermistor 29. The other end of the resistor 30 is connected to one end of a pre-set potentiometer 31. The other end of the pre-set potentiometer 31 is connected to the output of a constant current circuit section 32 and to the base of a transistor 34 included in an amplifier section 33. The constant current circuit section 32 comprises an FET 35 and a resistor 36 connected to the drain of the FET 35. The gate of the FET 35 and the resistor 36 are connected to the pre-set potentiometer 31. The source of the FET 35, that is, the power input terminal of the constant current circuit section 32, is connected to the collector of the switching transistor 13.

In the amplifier section 33 of the motor servo circuit 22, the emitter of a transistor 34 is connected to a connection point between the resistors 25 and 26. The collector of the transistor 34 is connected to the base of a transistor 37 and one end of a capacitor 38. The collector of the transistor 37 is grounded, and the emitter of the transistor 37 is connected to the base of a transistor 39. The collector of the transistor 39 is connected to the bridge circuit 23. The emitter of the transistor 39 and the other end of the capacitor 38 are connected to the battery 11 through the power switch 12. A resistor 40 is coupled between the emitters of the transistors 34 and 39. Another resistor 41 is connected between the collector of the transistor 34 and the emitter of the transistor 37.

Figure 2:
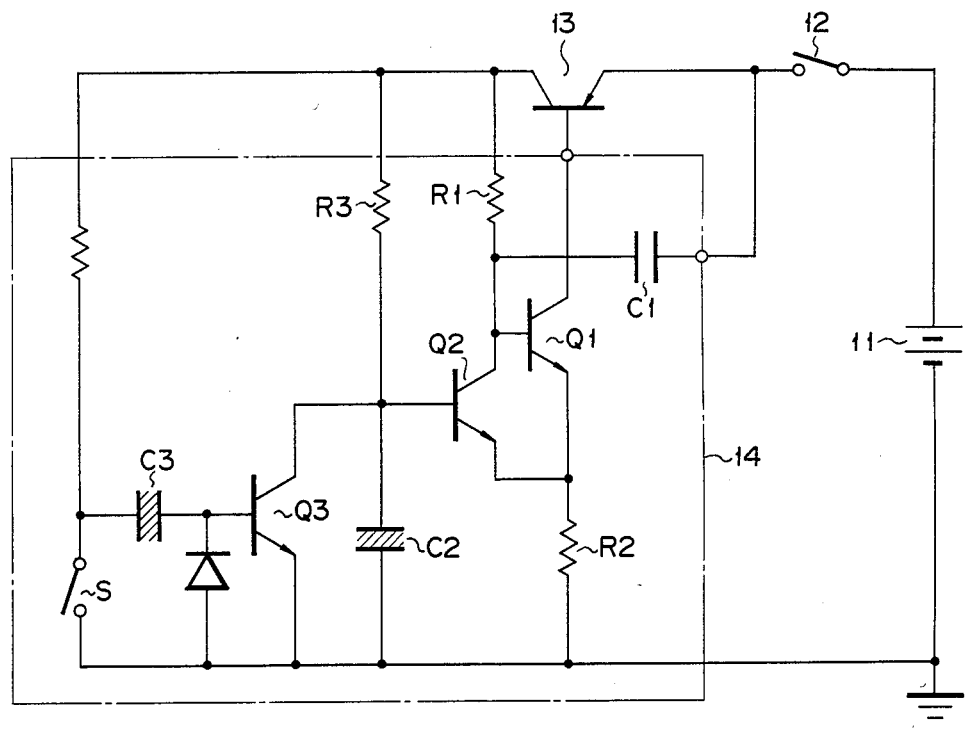
FIG. 2 is a circuit diagram of an automatic shutoff circuit used in the tape recorder of FIG. 1.

The automatic shutoff circuit 14 has a structure as illustrated in FIG. 2. A transistor $Q_1$ and resistors $R_1$ and $R_2$ form a self-holding circuit which is interlocked with the switching transistor 13. When the power switch 12 is closed, a pulse is supplied to the base of the transistor $Q_1$ through a capacitor $C_1$, thus turning on the transistor $Q_1$. An emitter current then flows through the switching transistor 13, and the switching transistor 13 is turned on. Current flows to the base of the transistor $Q_1$ through the resistor $R_1$, and the transistor $Q_1$ and the switching transistor 13 remain on thereafter. The self-holding circuit is released from the self-holding state by a transistor $Q_2$. The transistor $Q_2$ is turned on when the voltage at a capacitor $C_2$, which accumulates power supplied through a resistor $R_3$, becomes higher than the emitter voltage of the transistor $Q_2$. When the transistor $Q_2$ is turned on, the base and emitter of the transistor $Q_1$ are short-circuited. As a result, the transistor $Q_1$ and the switching transistor 13 are turned off.

The automatic shutoff circuit 14 further comprises a transistor $Q_3$ for controlling the discharge of the capacitor $C_2$. The transistor $Q_3$ is controlled by a switch S for detecting the rotation of a reel. While the reel is rotating, the switch S is periodically closed and opened, thus turning the transistor $Q_3$ on and off. Hence the capacitor $C_2$ is alternately charged and discharged. The voltage of the capacitor $C_2$ then does not reach the threshold voltage of the transistor $Q_2$. Therefore, the transistor $Q_1$ and the switching transistor 13 remain on while the reel is rotating. On the contrary, when the reel stops, the transistor $Q_3$ is kept off, regardless of whether the switch S is on or off. This is based on the fact that the capacitor $C_3$ is either completely discharged through the switch S when the switch S is kept on, or it is completely charged and no charging current flows through it when the switch S is kept off, so that no base current will flow into the transistor $Q_3$.

The operation of the tape recorder will now be described. When the power switch 12 is closed, the automatic shutoff circuit 14 generates a start signal. The start signal turns on the switching transistor 13. Power is then supplied from the battery 11 to the automatic shutoff circuit 14 and the amplifier 15 through the power switch 12 and the switching transistor 13. At the same time, power is supplied to the constant current circuit section 32 of the motor servo circuit 22 also through the switch 12 and the switching transistor 13. Power is supplied to the amplifier section 33 of the circuit 22 only through the switch 12. The output from the bridge circuit 23 is amplified by the amplifier section 33 which then controls the motor 21. More precisely, such a drive current as will balance the bridge circuit 23 flows through the motor 21, and the motor 21 is rotated at a constant speed. The speed of the motor 21 may be changed by adjusting the pre-set potentiometer 31. In the bridge circuit 23, the thermistor 29 is used to achieve temperature compensation and the diode 27 is used to compensate for the base-emitter characteristic of the transistor 34. The resistor 40 is provided for voltage fall-off compensation, and the capacitor 38 is used to adjust the servo-to-frequency characteristic of the motor servo circuit 22. The thermistor 24 is provided to achieve temperature compensation especially for the motor 21, and has a temperature characteristic corresponding to that of the coils of the motor 21.

Voltage is applied to the FET 35 of the constant current circuit section 32 of the motor servo circuit 22 via the switching transistor 13. This voltage is therefore lower than the voltage of the battery 11, though it does not adversely influence the constant current operation of the FET 35. Voltage is applied to the transistor 39 of the amplifier section 33 through the power switch 12, not through the switching transistor 13. This voltage is therefore substantially equal to the voltage of the battery 11, and the amplifier section 33 can readily operate. The motor 21 can be driven at a constant speed even if the ambient temperature is low (which increases the mechanical load on the motor 21) or even if the voltage of the battery 11 decreases as the battery 11 is drained. Hence, the tape recorder operates smoothly.

Upon detecting the end of a magnetic tape, the automatic shutoff circuit 14 stops supplying a signal to the switching transistor 13, thus turning off the transistor 13. The transistor 34 which has been biased by the constant current circuit section 32 is then turned off. The transistors 37 and 39 are also turned off, thereby stopping the motor 21. At the same time, the power supply of the amplifier 15 is stopped. If the power switch 12 is closed, current flows through the resistors 26 and 40. Nonetheless, this adds little to the power consumption of the battery 11 since the resistor 26 is about 10K, as in most amplifier sections used in known tape recorders.

As mentioned above, according to the present invention the battery voltage is applied to the constant current circuit section of the motor servo circuit through a switching element, and is also applied in a substantially direct manner to the amplifier section of the motor servo circuit. The motor servo circuit can therefore ensure a stable, smooth rotation of the motor, even if the battery voltage is relatively low or even if the mechanical load on the motor increases at a low temperature. The tape recorder is thus smoothly operated. In addition, no extra elements are necessary to prevent power loss in the automatic shutoff circuit from adversely influencing the motor servo circuit.

The present invention is not limited to the embodiment described above. The motor servo circuit used in the embodiment may be replaced by any motor servo circuit that can stop the motor when the power source is electrically disconnected from one of its components.

What is claimed is:

1. A tape recorder motor circuit, comprising:
    a power switch connected to a power source;
    a switching element connected to the power source through the power switch;
    automatic shutoff circuit means connected to the power source through the switching element and the power switch and including means for detecting an end of a magnetic tape and means for turning off the switching element in response to detection of the end of the magnetic tape by said detecting means;
    an amplifier circuit including power input means connected to the power source through the switching element, and an input terminal;
    a magnetic head connected to the input terminal of the amplifier circuit;
    a motor servo means including a constant current section connected to the power source through the switching element to be supplied with power from the power source through the switching element, and an amplifier section connected to the power source through the power switch to be supplied with power substantially directly from the power source, and an output for controlling the motor; and
    a motor controlled in response to the output of the motor servo means.

2. A tape recorder motor circuit, according to claim 1, wherein said motor servo means further comprises a bridge circuit which is connected to the constant current circuit section, one of whose branches is said motor, and a circuit section connected to the power source through only said power switch for amplifying the output from the bridge circuit to control said motor.

3. A tape recorder motor circuit, according to claim 2, wherein said bridge circuit includes a temperature compensating thermistor as one of the branches.

4. A tape recorder motor circuit, according to claim 2, wherein the output of said bridge circuit is supplied to a pre-set potentiometer.

5. A tape recorder motor circuit, according to claim 1, wherein said switching element is a transistor.

6. A tape recorder motor circuit, according to claim 1, wherein said power source is a battery.

* * * * *